United States Patent
Haninger et al.

[11] Patent Number: 5,860,901
[45] Date of Patent: Jan. 19, 1999

[54] MACHINE TOOL

[75] Inventors: Rudolf Haninger, Seitingen; Hans-Henning Winkler, Tuttlingen, both of Germany

[73] Assignee: Chiron-Werke GmbH & Co. KG, Tuttlingen, Germany

[21] Appl. No.: 839,119

[22] Filed: Apr. 23, 1997

[30] Foreign Application Priority Data

Apr. 25, 1996 [DE] Germany ............... 196 16 431.1

[51] Int. Cl.[6] ............................................. B23Q 3/157
[52] U.S. Cl. ........................................... 483/47; 483/38
[58] Field of Search ................... 483/47, 37, 38, 483/43, 53, 50, 66, 54, 55; 29/40

[56] References Cited

U.S. PATENT DOCUMENTS

| | | | |
|---|---|---|---|
| 3,544,286 | 12/1970 | Deckl et al. ......................... | 483/53 |
| 3,990,140 | 11/1976 | Polacek ............................... | 483/38 X |
| 4,930,208 | 6/1990 | Winkler .............................. | 483/38 X |
| 5,514,063 | 5/1996 | Stoll et al. .......................... | 483/66 |
| 5,624,365 | 4/1997 | Hanninger et al. ................. | 483/50 |

FOREIGN PATENT DOCUMENTS

| | | | |
|---|---|---|---|
| 2704789 | 11/1994 | France ................................ | 29/40 |
| 2618 172 C2 | 2/1984 | Germany . | |
| 3829 105 A1 | 3/1990 | Germany . | |
| 55-131452 | 10/1980 | Japan . | |

*Primary Examiner*—William R. Briggs
*Attorney, Agent, or Firm*—Cummings & Lockwood

[57] ABSTRACT

A machine tool comprises a spindle that rotates about a spindle axis and that comprises a receptacle for toolholders. There is further provided a number of tool changers distributed around the spindle, the gripper arm of each tool changer carrying a toolholder that can be transferred, by means of the gripper arm on which it is mounted, between a magazine position spaced from the spindle above the receptacle, and a working position on the receptacle. The toolholders are arranged in their magazine position with their longitudinal axes extending at an angle relative to the spindle axis so that they point away from the spindle obliquely in downward direction.

12 Claims, 2 Drawing Sheets

MACHINE TOOL

BACKGROUND OF THE INVENTION

1. Field of the Invention

The present invention relates to a machine tool having a spindle that rotates about a spindle axis and that comprises a receptacle for toolholders, and a plurality of tool changers distributed around the spindle, the gripper arm of each tool changer carrying a toolholder that can be transferred, by means of the gripper arm on which it is mounted, between a magazine position located at a distance from the spindle above the receptacle, and a working position on the receptacle.

2. Related Prior Art

A machine tool of this kind is known from DE 38 29 105 A1.

In the case of the known machine tool a sleeve surrounding the spindle can be displaced relative to the longitudinal axis of the spindle. Mounted on the sleeve are a plurality of tool changers with gripper arms each of which terminated at its lower end by a gripper carrying a toolholder. By means of the gripper arms, and by displacing the sleeve, the toolholders can selectively be brought into a working position or transferred from the latter into the sleeve.

The gripper arms are part of a parallelogram suspension which ensures that the toolholders are held with their axes substantially in vertical direction during the swinging movement between the working position and a magazine position. In the magazine position, the gripper arms are pivoted vertically upward so that the toolholders occupy a position above the receptacle, in the area of the sleeve, with the tapers of the toolholders accommodated in cavities formed in a radial projection on the sleeve. The cavities serve as space to receive the toolholder and to protect them from metal chips that may fly around in the working space of the known machine tool. It is ensured in this way that during a machining operation no metal chips can get onto the toolholders that are to be used next, and may stick to them because of the drilling fluid attaching to them, which otherwise could result in problems when changing-in and clamping the respective toolholder.

Further, with the known machine tool each gripper arm is provided with a cover serving to close the cavity when the arm is pivoted into its working position and the toolholder, consequently, is removed from the cavity. This prevents any metal chips from entering the cavity associated to that toolholder while the latter is in its working position.

The design of the grippers of the known machine tools is such that the toolholders are rotatably seated in them so that the respective gripper can remain in engagement with the toolholder even when the latter is in its working position. The grippers, consequently, have quite considerable radial dimensions.

It is a disadvantage of the known machine tool, on the one hand, that the circumferential space requirement is relatively large, due to the before-mentioned gripper dimensions, so that the machine tool may have considerable lateral dimensions in the presence of a given number of toolholders.

On the other hand, it is a disadvantage that the tool changer must perform a relatively long stroke in order to ensure that during transfer from the working position to the magazine position the tools, being aligned with their axes in vertical direction, are moved a sufficient length in upward direction so that in their magazine position they will not interfere with the machining operations that are carried out with the tool mounted in the spindle. This relatively long stroke is achieved by the fact that the parallelogram suspension comprises two relatively long bars which, in the magazine position, extend substantially transversely to the spindle axis, while in the working position they extend substantially in parallel to the spindle axis. The longer these bars, the longer is the stroke that can be achieved by pivoting the bars by approximately 90° during the tool-changing operation.

This design leads to the condition that the known machine tool not only has a considerable width, but also requires a considerable height in order to permit the tool change to take place without interfering with the work flow.

SUMMARY OF THE INVENTION

In view of this prior art, it is an object of the present invention to improve a machine tool of the kind mentioned at the outset so that the described disadvantages are avoided. In particular, it is to be rendered possible, with a simple structure in terms of construction and production technology, to reduce the dimensions of the machine tool in both, width and height.

According to the invention, this object is achieved with the machine tool mentioned at the outset by the fact that the toolholders are arranged in their magazine position with their longitudinal axes extending at an angle relative to the spindle axis so that they point away from the spindle obliquely in downward direction.

The object underlying the invention is completely achieved in this manner. Due to the fact that the toolholders are no longer held with their axes in vertical alignment, but are pivoted also to the outside during the tool-changing operation, a smaller stroke is already sufficient to bring the tools to a corresponding height, relative to the spindle, in their magazine position so that they will not interfere with the further machining operations. Given the fact that the tools and, thus, the toolholder now diverge at an angle, a smaller circumference is now required for a given number of toolholders which again has the effect to reduce the outer dimensions of the novel machine tool. The tapers of the toolholders, which have a smaller diameter, are now located closer to the spindle than in the case of the known machine tool, whereas the grippers holding the toolholders occupy a farther outward position. Thus, the tool changers can now be placed closer to the spindle, for a given number of toolholders, which again leads to smaller lateral dimensions.

In summary, the oblique arrangement of the toolholders, therefore, provides two advantages both of which lead to smaller transverse dimensions with the novel machine tool. On the one hand, the toolholders can be located closer to the spindle, while on the other hand a smaller vertical stroke is required to bring the tools to a given height. This latter feature means, however, that the bars of the parallelogram suspension, for example, can be made correspondingly shorter, which leads to smaller dimensions not only in transverse direction, but also in height.

According to a further embodiment of the invention it is then preferred that when the toolholders are in their magazine position, their longitudinal axes enclose with the spindle axis an angle of between 30° and 60°, preferably approximately 45°.

If the value of the angle is in the lower range, i.e. for example 30°, then the tools do not project very far in outward direction, in their magazine position, but on the other hand a correspondingly longer vertical stroke must be ensured. At the upper end of the stated range, a smaller stroke will be required, whereas the tools as such will project farther to the outside. A good compromise between these two conditions is a value of approximately 45°.

Altogether, it is preferred if each gripper arm is part of a four-bar linkage, which represents an irregular rectangle where one side has a length different from the length of all other sides.

It has already been known from DE 38 29 105 to make use of a special form of a four-bar linkage, namely of a parallelogram, for pivoting the gripper arm. The advantage of the parallelogram is seen in the fact that the alignment of the toolholders with their axes in vertical position will be maintained during the swinging movement. The inventors of the present invention now have found that a simple irregular rectangle, where one side is, for example, shorter than the other three sides, is a very simple structure that can be used in a way similar to the known parallelogram suspension but produces at the same time a tilting movement in combination with the swinging movement. This feature is, therefore, an advantage especially in constructional terms.

It is further preferred if every two opposite sides of the four-bar linkage have different lengths.

The advantage of this feature lies in the fact that it further increases the tilting movement so that a smaller vertical stroke is required to lift the toolholders and tilt them correspondingly. Thus, this feature is also advantageous in constructional terms.

Generally, it is preferred if the toolholders are at least partially seated in a cavity in their magazine position.

This feature provides the advantage, which is known as such, that the toolholders are protected in their magazine position from metal chips flying around in the working space of the machine tool.

Further, it is preferred if the tool changers are carried on a sleeve that can be displaced in the direction of the spindle axis, if each of the gripper arms is articulated on the sleeve via two bars, if each gripper arm is articulated on the first bar via a first axis and on the second bar via a second axis, and if the two bars are articulated on the sleeve via a third and a fourth axis, respectively, the four axes forming the corners of the four-bar linkage.

This feature, too, is of advantage in constructional terms. As has been known already from the prior art, only a very small number of components is required to form the four-bar linkage that can be operated by an external force, for example by a piston-and-cylinder unit.

It is further preferred in this context if the first bar is arranged above the second bar and if the distance between the first and the second axes is greater than the distance between the second and the fourth axes.

It is of advantage here that this is a very simple way to form an irregular four-bar linkage where the displacement of the two movable axes, i.e. the first and the second axes, automatically leads to a pivotal movement, i.e. to a tilting movement, of the toolholders.

This advantage is alternatively achieved when the distance between the first and the second axes is greater than the distance between the third and the fourth axes.

The two last-mentioned features may, however, be used also in combination in order to advantageously achieve a greater tilting movement, as described before.

Finally, it is preferred if the second bar is equipped with a cover that closes the cavity when the respective toolholder occupies its working position. This feature is also known as such; it ensures that no metal chips will get into the cavity while the respective toolholder is in its working position. For, metal chips that may collect in that cavity have the result that the cavity, while being normally protected by the taper of the tool, may nevertheless be soiled so that the intended advantages of the cavity would finally not be achieved.

Further advantages will become apparent from the specification and the attached drawing.

It should be noted that the before-mentioned features and those to be explained below can be used not only in the respective combinations indicated, but also in other combinations or in isolation, without leaving the context of the present invention.

BRIEF DESCRIPTION OF THE DRAWINGS

An embodiment of the invention is depicted in the appended drawings and will be explained in more detail in the description below. In the drawings.

DETAILED DESCRIPTION OF THE PREFERRED EMBODIMENT

Figure 1:
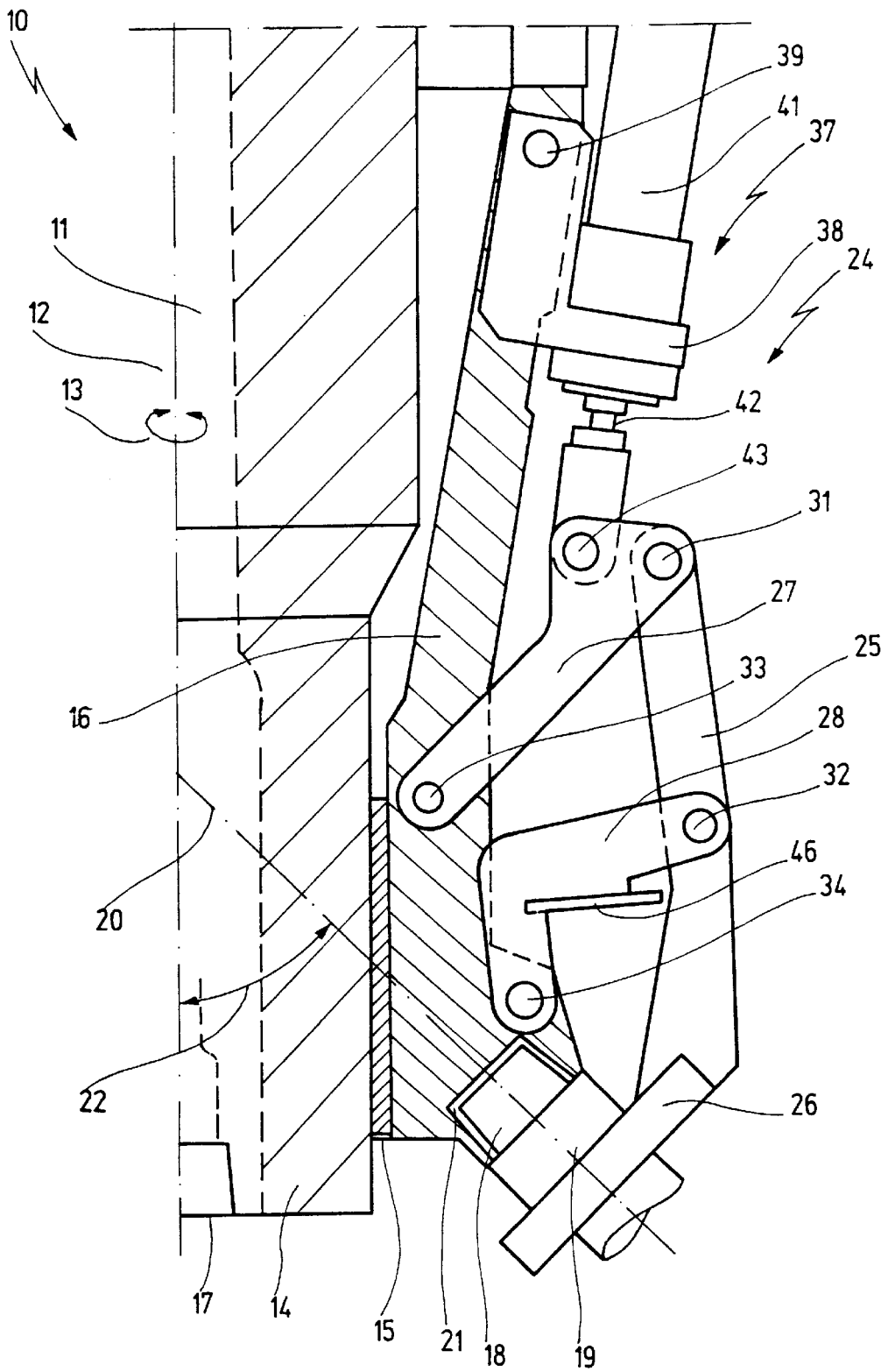
FIG. 1 shows a—partly sectioned—side view of the novel machine tool in the area of the tool changer, with a toolholder in its magazine position.

FIG. 1 shows a machine tool according to the invention, indicated by reference numeral 10, with a rotating spindle 11 which rotates about a spindle axis 12, as indicated by arrow 13, and which is seated in a headstock 14, indicated schematically in the drawing.

Mounted on the headstock 14 for longitudinal displacement in the direction of the spindle axis 12 is a sleeve 15 with a plurality of tool changer arms 16 distributed around its circumference.

At the lower end of the spindle there is provided a receptacle 17 for a taper 18 of a toolholder indicated at 19, which has a longitudinal axis 20.

In the magazine position illustrated in FIG. 1 the taper 18 is seated in a cavity 21 provided in the sleeve 15, whereby it is protected from metal chips that may fly around.

It will be noted that in the representation of FIG. 1 the toolholder 19 is inclined relative to the spindle axis 12 in such a way that it points in downward and outward direction at an angle, its longitudinal axis 20 intersecting the spindle axis 12 at an angle 22 of approximately 45°.

Due to this oblique arrangement of the toolholders 19, a greater number of toolholders can be accommodated on a given circumference of the spindle 11 than if the toolholders 19 were aligned with their axes in vertical position. Or to say it in other words, a smaller circumference is required for a given number of toolholders 19 when the toolholders are arranged in inclined alignment, as illustrated in FIG. 1. Another advantage of this inclined alignment lies in the fact that only a small vertical stroke is required to move the tools—which are not shown in FIG. 1 for the sake of clarity—a corresponding length in upward direction. The lifting movement is assisted by the tilting movement.

Figure 2:
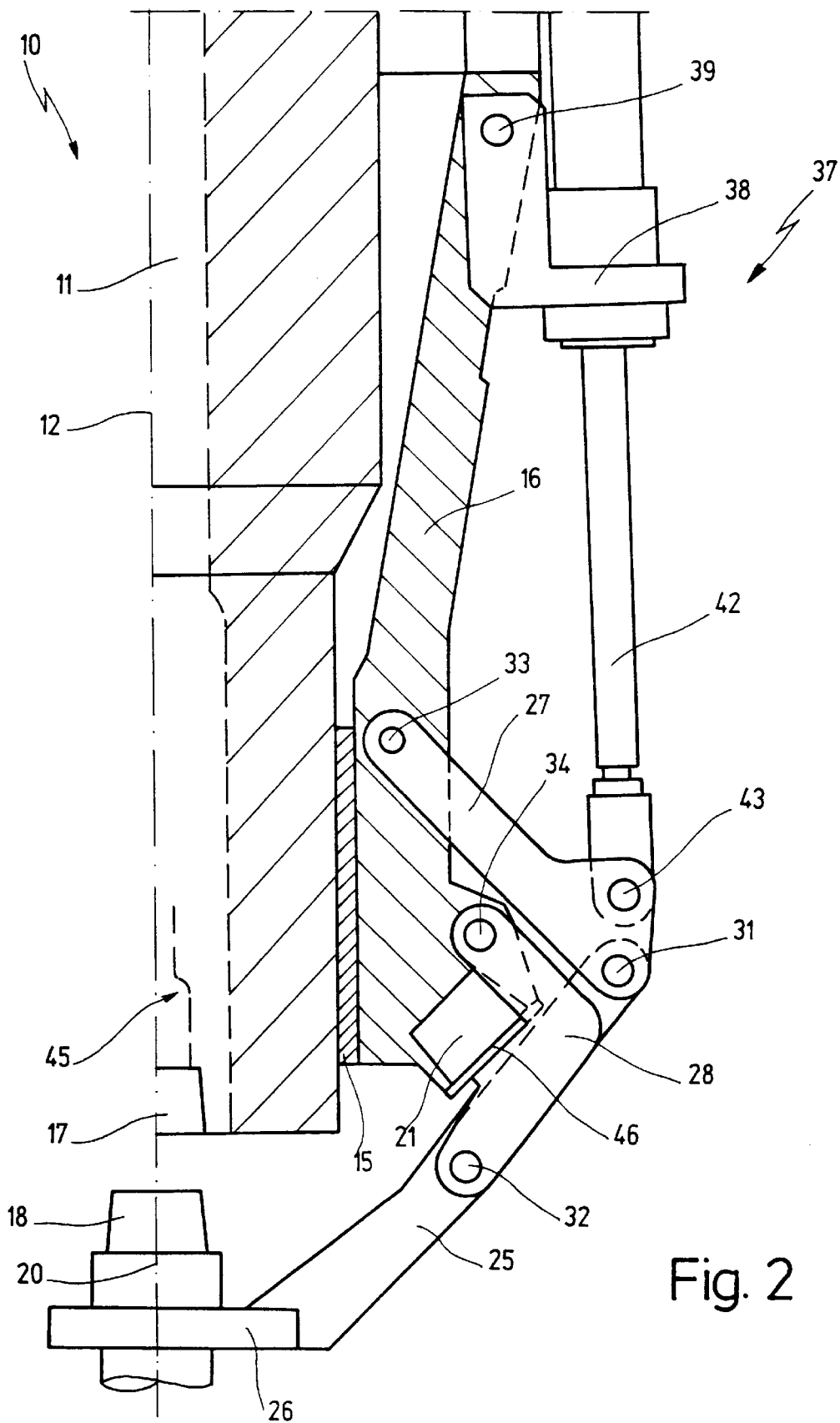
FIG. 2 shows a representation similar to that of FIG. 1, but with a toolholder in its working position.

The transfer of the toolholders 19 between their magazine position shown in FIG. 1 and their working position below the receptacle 17 of the spindle 11 shown in FIG. 2 is effected with the aid of a tool changer 24, of which the tool changer arm is a part and which comprises a gripper arm 25 whose lower end terminates by a gripper 26 that carries the toolholder 19.

The gripper arm 25 is articulated on the tool changer arm 16 via a first bar 27 and a second bar 28. To this end the gripper arm is articulated via a first axis 31 on the first bar 27 and via a second axis 32 on the second bar 28. The first bar 27 and the second bar 28 are articulated on the sleeve 15 via a third axis 33 and a fourth axis 34, respectively, so that the four axes 31, 32, 33, 34 form the four corners of a four-bar linkage.

The four-bar linkage is irregular, the distance between the axes 31 and 33 being greater than the distance between the axes 32 and 33. Moreover, the distance between the axes 31 and 32 is greater than the distance between the axes 33 and 34.

The distances between the axes form the sides of the four-bar linkage, which means that the upper and the outer sides of the four-bar linkage are longer than the lower and the inner sides, respectively. Consequently, the gripper arm 25 swings to the right above the axis 32 and to the left below the axis 32 when the first bar 27 is rotated about the axis 33 to the right. This condition is illustrated in FIG. 2.

The swinging movement of the four-bar linkage is effected by a piston-and-cylinder unit 37 which is articulated on the tool changer arm 16 of the sleeve 15 via a holder 38 mounted on an axis 39. The holder 38 holds a cylinder 41 whose piston 42 is articulated on the first bar 27 via an axis 43.

In the condition illustrated in FIG. 1, if the piston 42 is then extended from the cylinder 41, this has the effect to swing the first bar 27 about the axis 33 in FIG. 1 to the right and in downward direction, while the second bar 28, being designed as L-shaped angle, follows this swinging movement and swings to the right and in downward direction about its axis 34.

This swinging movement has the effect that the taper 18 of the toolholder 19 disengages from the cavity 21 and comes to occupy its working position illustrated in FIG. 2, in which its longitudinal axis 20 is aligned with the spindle axis 12. When the sleeve 15 is now moved in upward direction, as viewed in FIG. 2, the taper 18 engages the receptacle 17 and is drawn into it by a clamping mechanism indicated schematically at 45.

In the position illustrated in FIG. 2 the cavity 21 is closed by a cover 46 provided on the second bar 28.

If one compares FIGS. 1 and 2, one further notes that the piston-and-cylinder unit 37 as such also performs a certain swinging movement about the axis 39 as the tool changer 24 transfers a toolholder 19 between the magazine position shown in FIG. 1 and the working position shown in FIG. 2.

It is understood that a certain number of toolholders 24, for example 8, are distributed about the circumference of the spindle 11.

Therefore, what I claim is:

1. A machine tool, having
   a spindle rotatable about a spindle axis, said spindle comprising an individual movable receptacle for toolholders,
   a plurality of tool changers arranged around said spindle, each tool changer comprising a gripper arm carrying a toolholder, said toolholder to be transferred by means of its respective gripper arm between a magazine position located above said receptacle, and a working position at said receptacle,
   wherein each toolholder is arranged in its magazine position with its longitudinal axis extending at an angle relative to the spindle axis such that it points away from the spindle obliquely in a downward direction.

2. A machine tool, having:
   a spindle rotatable about a spindle axis, said spindle comprising a receptacle for toolholders,
   a plurality of tool changers arranged around said spindle, each tool changer comprising a gripper arm carrying a toolholder, said toolholder to be transferred by means of its respective gripper arm between a magazine position located above said receptacle, and a working position at said receptacle,
   wherein each toolholder is arranged in its magazine position with its longitudinal axis extending at an angle relative to the spindle axis such that it points away from the spindle obliquely in a downward direction,
   wherein the toolholder, in its magazine position, is at least partially seated in a cavity, and
   wherein the tool changers are carried on a sleeve that can be displaced in the direction of the spindle axis, each of the gripper arms is articulated on the sleeve via two bars, each gripper arm is articulated on the first bar via a first axis and on the second bar via a second axis, and the two bars are articulated on the sleeve via a third and a fourth axis, respectively, the four axes forming the corners of a four-bar linkage.

3. The machine tool of claim 1, wherein the angle is approximately 45°.

4. A machine tool having:
   a spindle rotatable about a spindle axis, said spindle comprising a receptacle for toolholders,
   a plurality of tool changers arranged around said spindle, each tool changer comprising a gripper arm carrying a toolholder, said toolholder to be transferred by means of its respective gripper arm between a magazine position located above said receptacle, and a working position at said receptacle,
   wherein each toolholder is arranged in its magazine position with its longitudinal axis extending at an angle relative to the spindle axis such that it points away from the spindle obliquely in a downward direction, and
   wherein each gripper arm is part of a four-bar linkage, which represents an irregular rectangle where one side has a length different from the length of all other sides.

5. The machine tool of claim 4, wherein every two opposite sides of the four-bar linkage have different lengths.

6. A machine tool having:
   a spindle rotatable about a spindle axis, said spindle comprising a receptacle for toolholders,
   a plurality of tool changers arranged around said spindle, each tool changer comprising a gripper arm carrying a toolholder, said toolholder to be transferred by means of its respective gripper arm between a magazine position located above said receptacle, and a working position at said receptacle,
   wherein each toolholder is arranged in its magazine position with its longitudinal axis extending at an angle relative to the spindle axis such that it points away from the spindle obliquely in a downward direction,
   wherein in the magazine position, the longitudinal axis of the toolholders enclose with the spindle axis an angle of between 30° and 60°, and
   wherein the tool changers are carried on a sleeve that can be displaced in the direction of the spindle axis, each of the gripper arms is articulated on the sleeve via two bars, each gripper arm is articulated on the first bar via a first axis and on the second bar via a second axis, and the two bars are articulated on the sleeve via a third and a fourth axis, respectively, the four axes forming the corners of a four-bar linkage.

7. The machine tool of claim 6, wherein the angle is approximately 45°.

8. The machine tool of claim 6, wherein the first bar is arranged above the second bar and the distance between the first and the second axes is greater than the distance between the second and the fourth axes.

9. The machine tool of claim 6, wherein the first bar is arranged above the second bar and the distance between the first and the second axes is greater than the distance between the third and the fourth axes.

10. The machine tool of claim 8, wherein the first bar is arranged above the second bar and the distance between the first and the second axes is greater than the distance between the third and the fourth axes.

11. A machine tool, having:

a spindle rotatable about a spindle axis, said spindle comprising a receptacle for toolholders, a plurality of tool changers arranged around said spindle, each tool changer comprising a gripper arm carrying a toolholder, said toolholder to be transferred by means of its respective gripper arm between a magazine position located above said receptacle, and a working position at said receptacle, wherein each toolholder is arranged in its magazine position with its longitudinal axis extending at an angle relative to the spindle axis such that it points away from the spindle obliquely in a downward direction, whereby the angle between the longitudinal axis of a toolholder in its magazine position and the spindle axis is the same for each toolholder.

12. The machine tool of claim 2, wherein the second bar is equipped with a cover that closes the cavity when the respective toolholder occupies its working position.

\* \* \* \* \*